Sept. 20, 1938.　　　　　N. E. FUNK　　　　　2,130,488
PAPER BOX AND BLANK FOR PRODUCING THE SAME
Filed Aug. 19, 1937　　　　11 Sheets-Sheet 1

Inventor
Nelson E. Funk
By Brown, Jackson, Boettcher & Dienner
Attys

Sept. 20, 1938.    N. E. FUNK    2,130,488
PAPER BOX AND BLANK FOR PRODUCING THE SAME
Filed Aug. 19, 1937    11 Sheets-Sheet 2
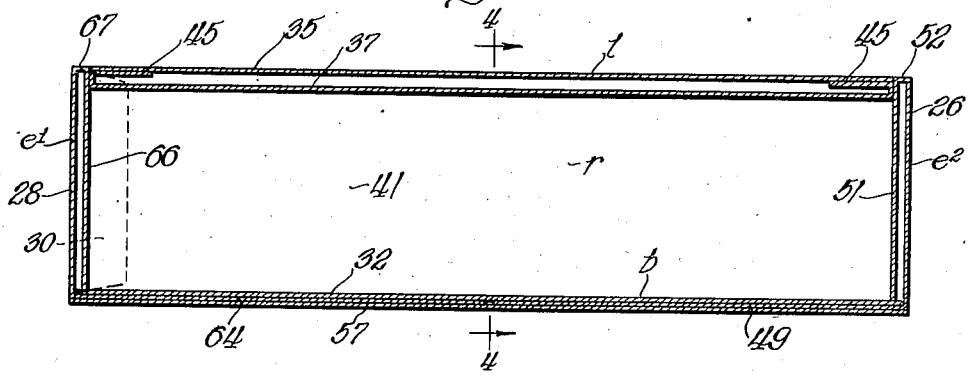
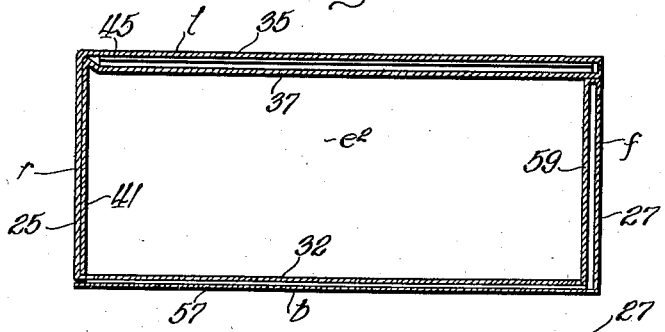
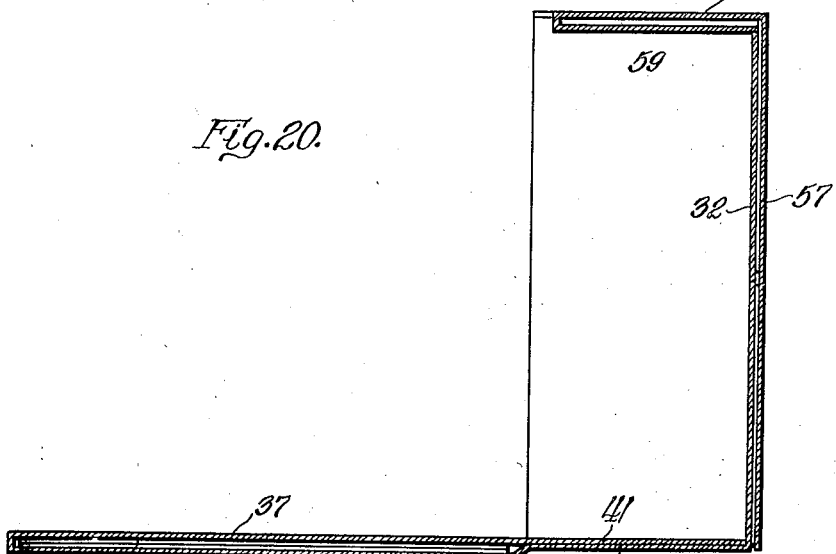
Inventor
Nelson E. Funk

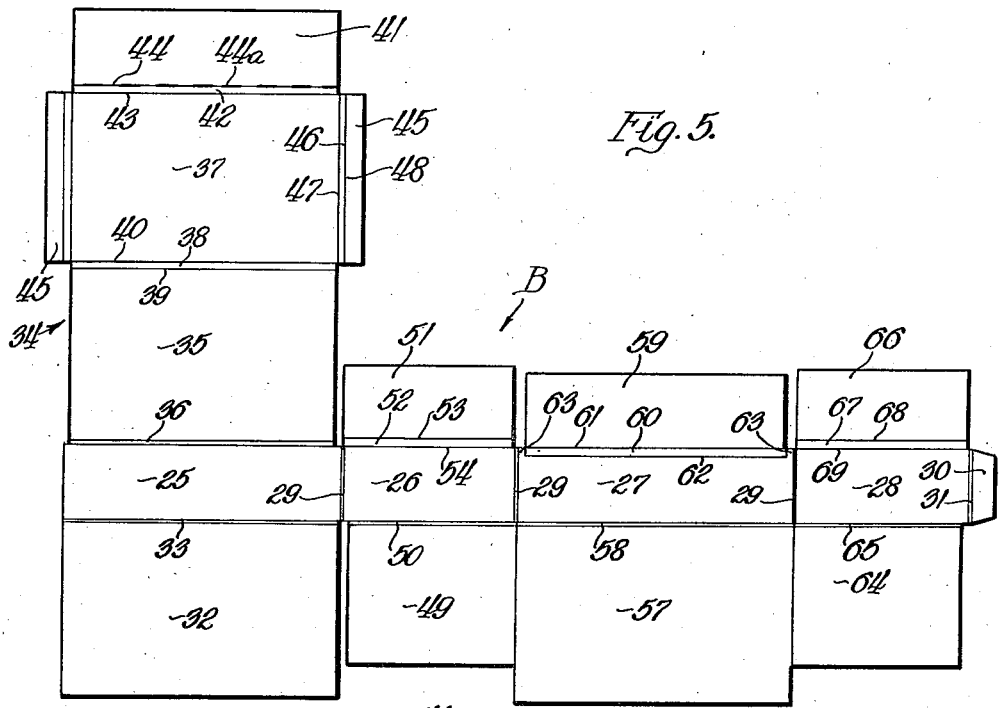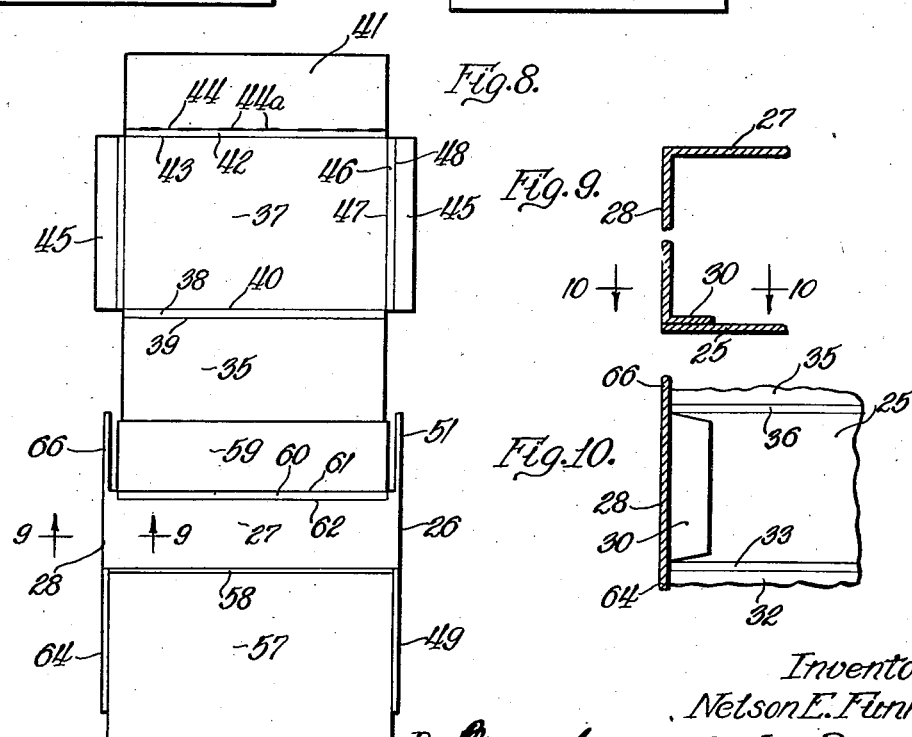

Sept. 20, 1938.  N. E. FUNK  2,130,488
PAPER BOX AND BLANK FOR PRODUCING THE SAME
Filed Aug. 19, 1937  11 Sheets-Sheet 4
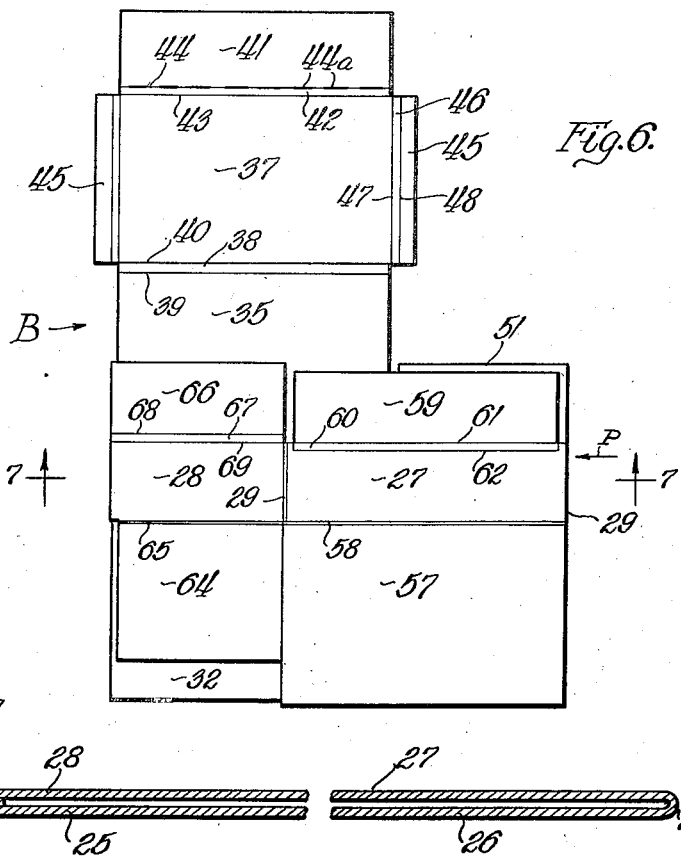
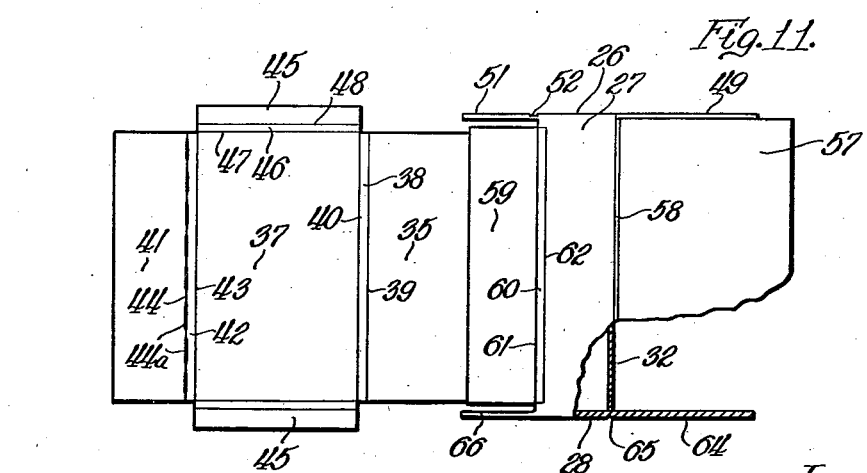
Inventor
Nelson E. Funk
By ~~~~
attys

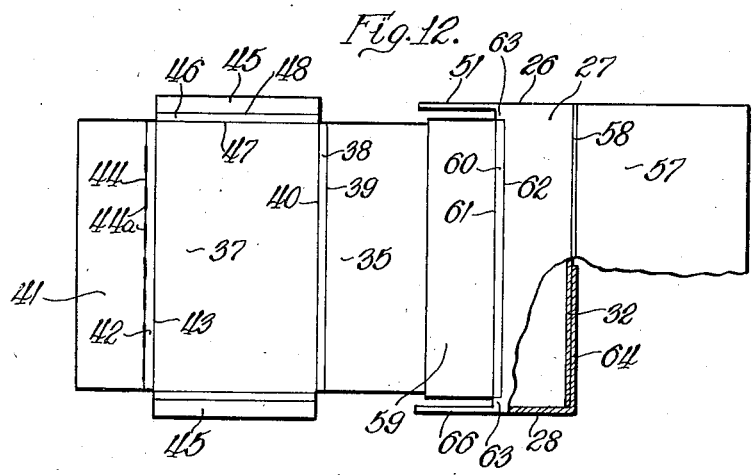

Sept. 20, 1938.　　　　N. E. FUNK　　　　2,130,488
PAPER BOX AND BLANK FOR PRODUCING THE SAME
Filed Aug. 19, 1937　　　11 Sheets-Sheet 6
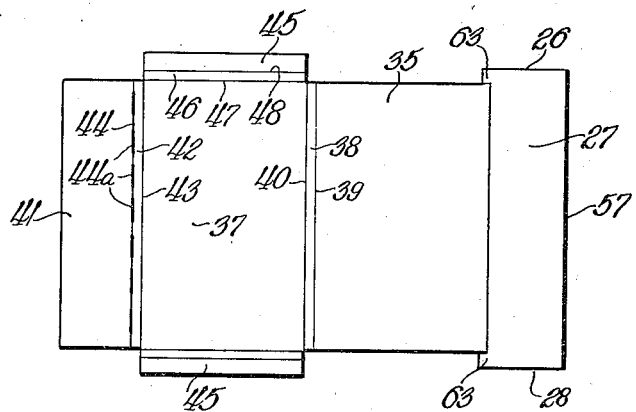
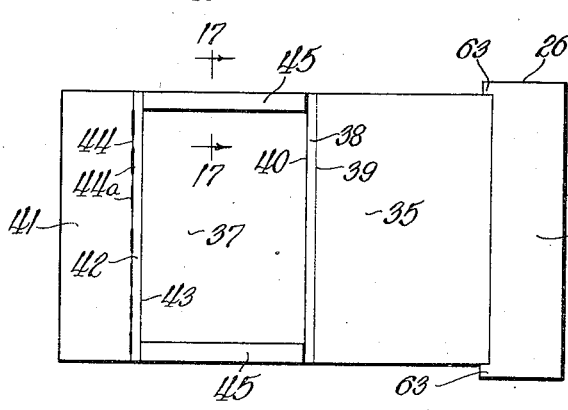
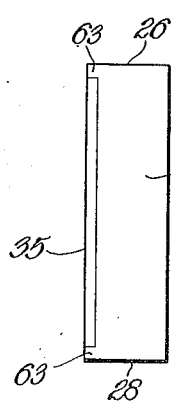
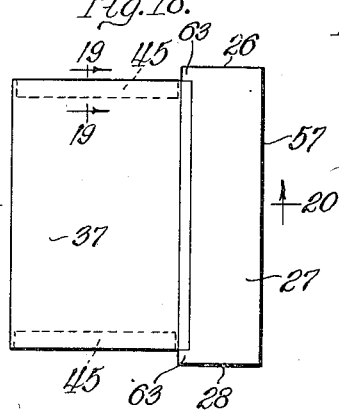
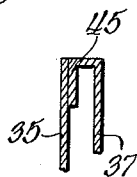
Inventor
Nelson E. Funk
By Brown Jackson Boettcher Dienner
Att'ys Sept. 20, 1938.  N. E. FUNK  2,130,488
PAPER BOX AND BLANK FOR PRODUCING THE SAME
Filed Aug. 19, 1937  11 Sheets-Sheet 7

DIRECTION OF GRAIN

Inventor
Nelson E. Funk

Sept. 20, 1938.   N. E. FUNK   2,130,488
PAPER BOX AND BLANK FOR PRODUCING THE SAME
Filed Aug. 19, 1937   11 Sheets-Sheet 8

Inventor:
Nelson E. Funk.
By Mawr Jackson Boettcher Drewer
Attys.

Sept. 20, 1938.　　　　N. E. FUNK　　　　2,130,488
PAPER BOX AND BLANK FOR PRODUCING THE SAME
Filed Aug. 19, 1937　　　11 Sheets-Sheet 9
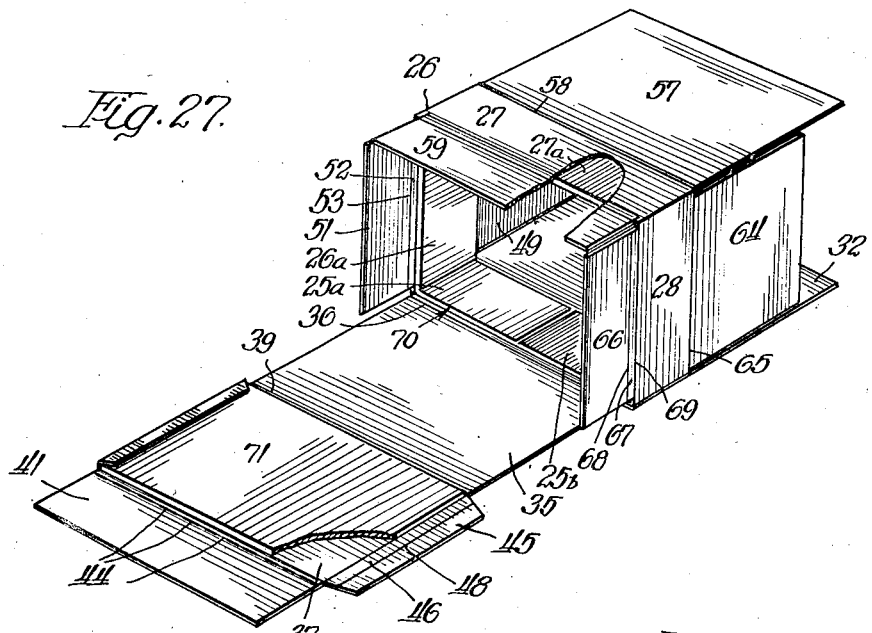
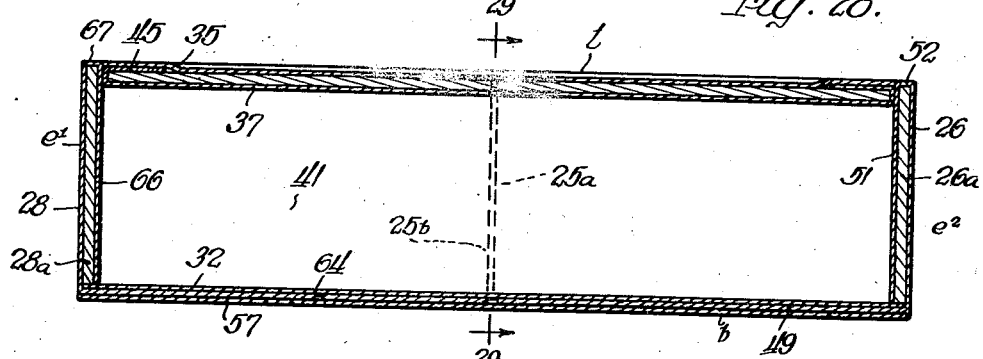
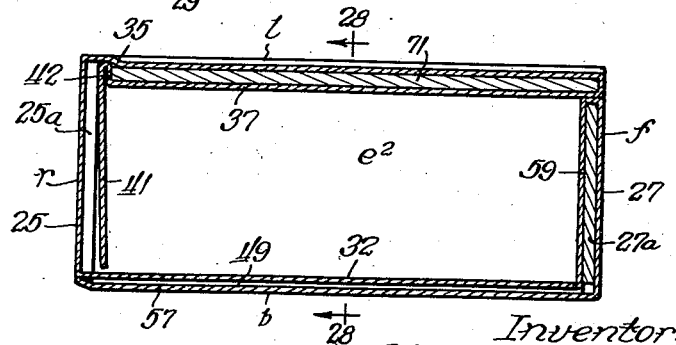
Inventor:
Nelson E. Funk.

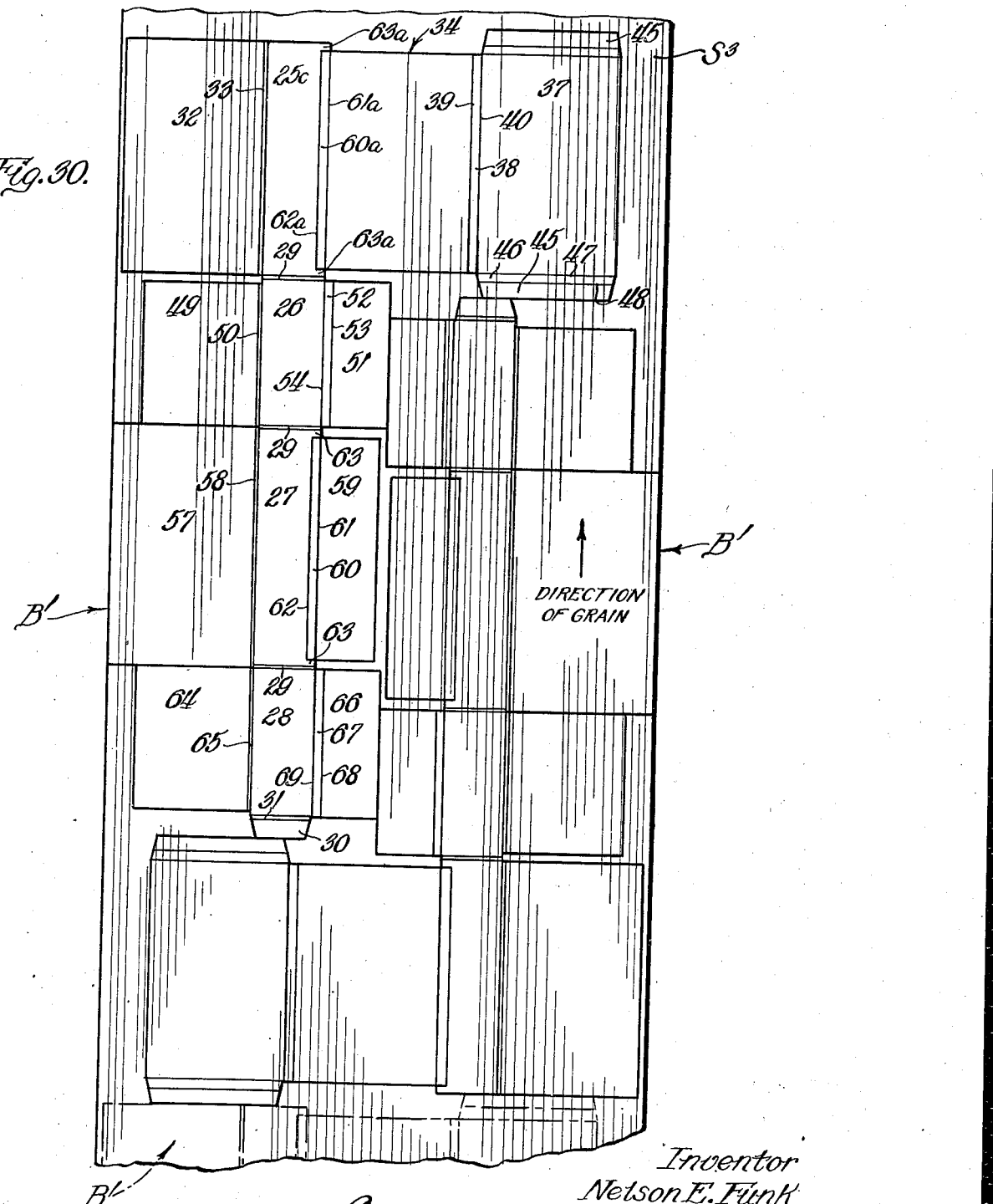

Sept. 20, 1938.  N. E. FUNK  2,130,488
PAPER BOX AND BLANK FOR PRODUCING THE SAME
Filed Aug. 19, 1937  11 Sheets-Sheet 11
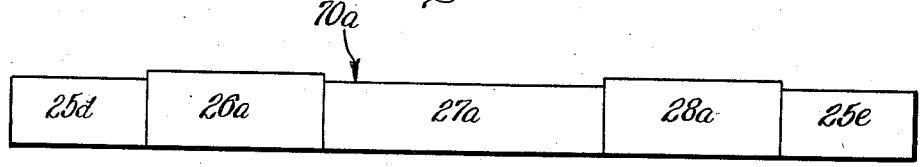
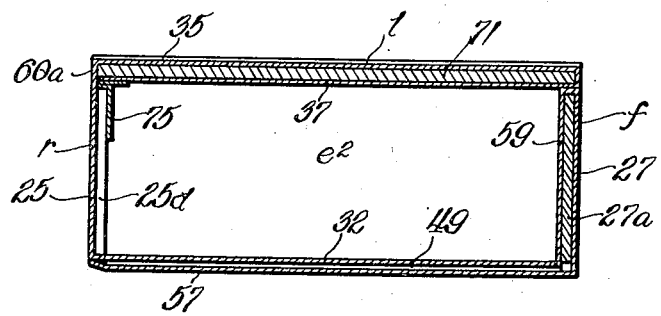
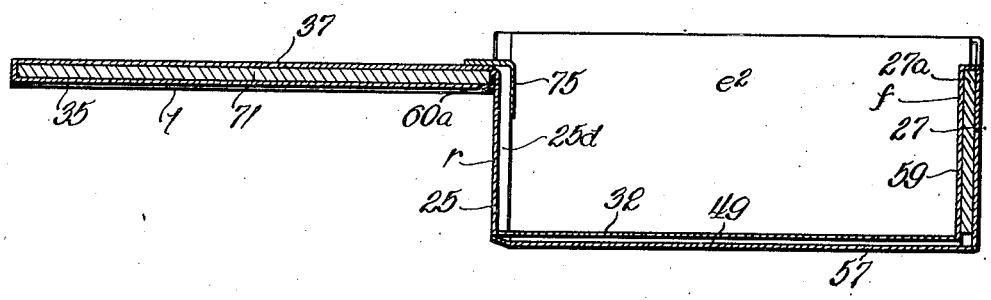
Inventor
Nelson E. Funk
By Brown, Jackson, Boettcher, Dienner
Attys Patented Sept. 20, 1938

2,130,488

UNITED STATES PATENT OFFICE 2,130,488

PAPER BOX AND BLANK FOR PRODUCING THE SAME

Nelson E. Funk, Elkhart, Ind., assignor to American Coating Mills, Inc., Elkhart, Ind., a corporation of Indiana Application August 19, 1937, Serial No. 159,847

14 Claims. (Cl. 229—23)

This invention relates to paper boxes formed of cardboard or analogous material, and has to do with a blank for producing such boxes and the construction of the box itself.

My invention is directed to the production of boxes formed of cardboard or analogous material, such boxes being of light weight, adequate mechanical strength and capable of being produced at exceptionally low cost. More specifically, my invention has for one of its main objects the production of a cardboard box the major portion of which is of hollow double walled construction, such box being intended to replace the ordinary wooden cigar box now commonly used and being capable of production at a cost equal to but a fraction of the cost of production of the wooden cigar boxes referred to. It is also an object to provide a blank which may be shipped flat and can readily be folded and assembled, at the cigar factory or other place of use, with expedition and facility to produce the finished box. A further and more specific object is to provide a box of the character stated, in one form of which certain of the elements thereof cooperate to confine one another in proper assembled relation thus reducing the necessity for the use of adhesive or other securing means. It is also an object to provide, in another form of the box of my invention, reinforcing inserts related to the box structure in a novel manner to act to best advantage, the box blank and the inserts being cut in a novel manner to that end. While my invention is particularly applicable to the production of cigar boxes, and is illustrated in that form by way of example, it is, in its broader aspects, applicable to boxes of various types and forms. Further objects and advantages of my invention will appear from the detail description.

In the drawings:

Figure 3 is a lengthwise vertical central sectional view through the box of Figure 1;

Figure 4 is a transverse vertical central view through the box of Figure 1 taken substantially on line 4—4 of Figure 3;

Figure 5 is a plan view of the blank from which the box is formed, in its fully extended condition prior to folding for shipment;

Figure 6 is a plan view of the blank of Figure 5 partially folded, for shipment;

Figure 7 is a sectional view through the blank of Figure 6, on an enlarged scale, taken substantially on line 7—7 of Figure 6;

Figure 8 is a front view of the blank partially folded for producing the box, illustrating the first step in the operation of forming the blank into the box;

Figure 9 is a fragmentary sectional view, on an enlarged scale, taken substantially on line 9—9 of Figure 8;

Figure 10 is a fragmentary sectional view taken substantially on line 10—10 of Figure 9;

Figure 11 is a front view of the blank partially folded for forming the box, illustrating the second step in the operation of folding the blank into box form, the blank being partially broken away and partly shown in section;

Figure 12 is a view similar to Figure 11 illustrating the third step in the operation of folding the blank into box form;

Figure 22:
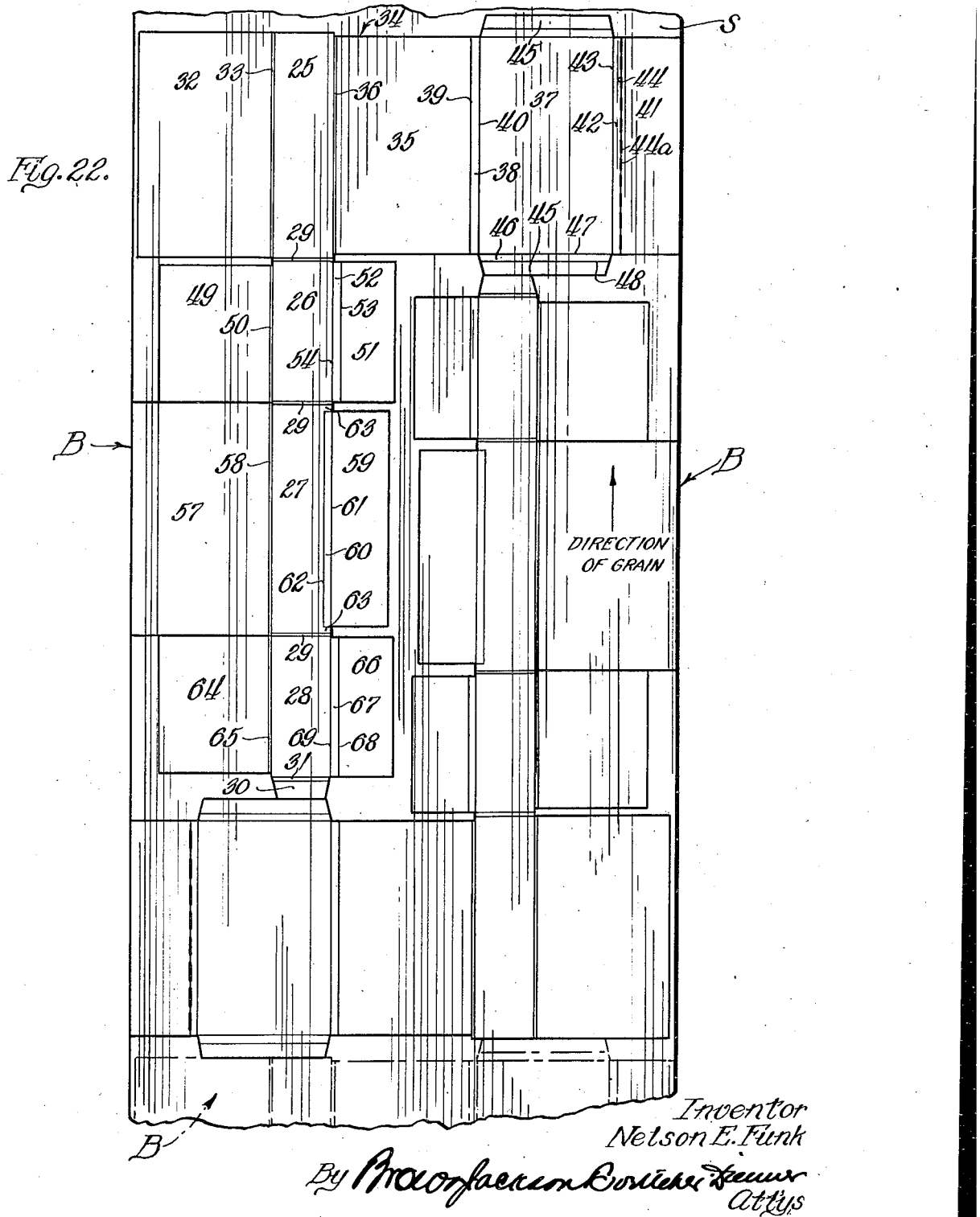
Figure 23:
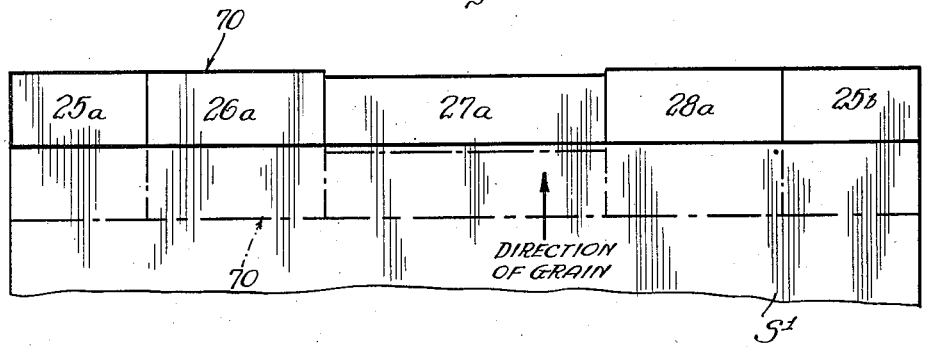
Figure 24:
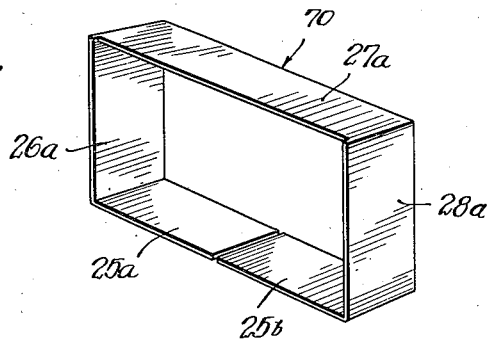
Figure 25:
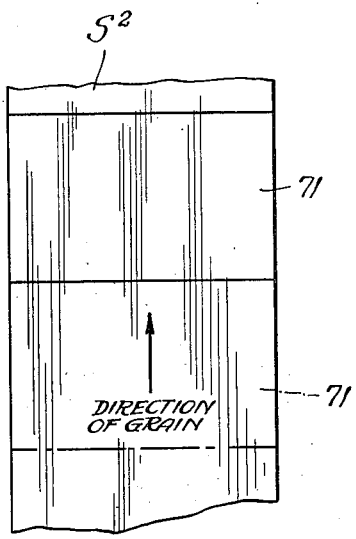
Figure 26:
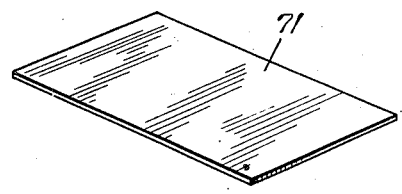

Figures 13 to 16, inclusive, are front views of the blank illustrating successive steps in the operation of folding thereof into box form;

Figure 17 is a fragmentary sectional view, on an enlarged scale, taken substantially on line 17—17 of Figure 16;

Figure 18 is a front view of the folded blank illustrating the step of folding the lid flap into position for providing and securing the lid;

Figure 19 is a fragmentary sectional view, on an enlarged scale, taken substantially on line 19—19 of Figure 18;

Figure 20 is a sectional view, on an enlarged scale, taken substantially on line 20—20 of Figure 19;

Figure 21 is a front view of the completed box produced by folding the blank into box form;

Figure 22 is a fragmentary plan view of a strip of cardboard and two box blanks cut therefrom, illustrating the method of cutting the blanks;

Figure 23 is a fragmentary plan view of a strip of cardboard and a box body reinforcing insert cut therefrom, illustrating the method of cutting such inserts;

Figure 24 is an isometric end view of a box body reinforcing insert in folded condition;

Figure 25 is a fragmentary plan view of a strip of cardboard and a box lid reinforcing insert cut therefrom, illustrating the method of cutting such inserts;

Figure 26 is an isometric top view of the insert of Figure 25;

Figure 27 is an isometric end view of a partly folded box blank, with the body insert and the lid insert placed in positions preliminary to completion of the folding of the blank to produce a reinforced box constituting a modified form of the box of my invention;

Figure 28 is a central vertical lengthwise sectional view through the completed box provided with the reinforcing inserts of Figure 27, on an enlarged scale, taken substantially on line 28—28 of Figure 29;

Figure 29 is a sectional view taken substantially on line 29—29 of Figure 28;

Figure 30 is a view like Figure 22, showing the blank used in producing a second modified form of box embodying my invention;

Figure 31 is a plan view of a box body reinforcing insert, in extended condition, intended for use in a box formed from the blank of Figure 30;

Figure 32 is a central transverse sectional view through a reinforced box formed from the blank of Figure 30, illustrating the second modified form of my invention above referred to, with the lid in fully closed position; and Figure 33 is a view like Figure 32, but with the lid in fully opened position.

I have illustrated my invention, by way of example, as embodied in a box such as that commonly used for containing cigars. This box is cubiform and comprises bottom $b$, ends $e^1$ and $e^2$, front $f$, back or rear member $r$ and lid $l$, the latter being hingedly connected to the upper edge of rear member $r$. The box thus formed is produced from the blank of Figure 5, in a manner which will be described presently. For convenience and accuracy of description, the various elements of the blank will be described with reference to the positions which such elements occupy in the completed box.

The blank may be considered as consisting of two end sections, a front section and a rear or back section, including means for forming the lid and bottom as well as means for providing inner wall members for the ends and the front and the back of the box. It comprises a back outer wall member 25, an end outer wall member 26, a front outer wall member 27 and a second end outer wall member 28, these members being connected together end to end in alternate relation with folding creases 29 therebetween. The end outer wall member 28 is provided at its free end with a securing tab 30, having a folding crease 31 extending along the outer end of member 28, for a purpose which will appear presently. The blank, formed as shown in Figure 5, is cut from a sheet of cardboard, or other suitable analogous material, being formed in one piece as shown.

Back wall member 25 is provided, at its lower edge, with a bottom flap 32, there being a folding crease 33 extending along the lower edge of member 25 for folding flap 32 toward the inner face of member 25 into position perpendicular thereto. An elongated flap 34 extends from the upper edge of member 25 and is suitably formed for producing the lid of the box. This flap 34 may be considered as comprising an outer lid flap 35 connected at its back edge to the upper edge of member 25, with a folding crease 36 therebetween, an inner lid flap 37 connected at its front edge to the front edge of flap 35 by a spacing element 38, the latter defined by two spaced parallel folding pieces 39 and 40, and a securing flap 41 connected at its upper edge to the back edge of flap 37, by a spacing element 42 defined by two spaced parallel folding creases 43 and 44, the latter crease being provided with spaced lengthwise slits 44ª for increased flexibility, for a purpose which will appear presently. Flap 37 is provided, at each end thereof, with a securing tab 45 connected to flap 37 by a spacing element 46 defined by spaced parallel folding creases 47 and 48.

The end outer wall member 26 is provided, at its lower edge, with a bottom flap 49, there being a folding crease 50 extending along the lower edge of member 26 to permit folding of the latter toward the inner face of member 26 into position perpendicular thereto. An inner wall flap 51 is connected, at its upper edge, to the upper edge of member 26, by a spacing element 52 defined by two spaced parallel folding creases 53 and 54, the latter coincident with the upper edge of member 26.

The outer front wall member 27 is provided with a bottom flap 57 extending from its lower edge, with a folding crease 58 along such lower edge permitting folding of flap 57 toward the inner face of member 27 perpendicular thereto. Member 27 is further provided with an inner wall flap 59 connected, at its upper edge, to the upper edge of member 27 by a spacing element 60 defined by two spaced parallel folding creases 61 and 62 corresponding respectively to the upper edge of flap 59 and the upper edge of member 27. It will be noted that member 27 is equal in width, at its ends, to members 26 and 28, which are of equal width or height, that flap 59 has each end spaced inward a short distance from the adjacent end of member 27 and is of less height than the ends of the latter member by the width of spacing element 60, the portion of member 27 corresponding to flap 59 being equal in height to the latter. There is thus provided, at each upper corner of member 27, a projection 63 which extends above the upper edge of member 27, defined by the folding crease 62, a distance equal to the width of spacing element 60.

End member 28 is provided with a bottom flap 64 extending from its lower edge, with a folding crease 65 along this edge permitting folding of flap 64 toward the inner face of member 28 into position perpendicular thereto. An inner wall flap 66 is connected to the upper edge of member 28, by a spacing element 67 defined by two spaced parallel folding creases 68 and 69 coincident with the upper edges of flap 66 and member 28, respectively.

The outer wall members 25, 26 and 28, and the ends of the front outer wall member 27 are all of the same height, the portion of member 27 corresponding to flap 59 being of the same height as the latter. Spacing elements 52, 60 and 67 are of equal width, although this may not be essential in all cases, inner wall flaps 51 and 66 are respectively equal in height to the outer end wall members 26 and 28, and the height of the portion of member 27 corresponding to flap 59 is less than that of members 26 and 28 by an amount equal to the width of the spacing element 60. The ends of the outer lid flap 35 are spaced inwardly from the ends of back outer wall 25 a distance equal to the width of spacing elements 52 and 67, respectively, flap 35 is equal in width to the width of members 26 and 28, the width of which determines the exterior width of the box, flap 37 corresponds in width and length to flap 35, flap 41 corresponds in height to member 25 and in width to the outer cover flap 35, bottom flap 32 corresponds in length to member 25 and is of less width than the end outer wall members 26 and 28 by an amount equal to the width of spacing element 60, flaps 51 and 66 correspond in width and height to members 26 and 28, respectively, bottom flaps 49 and 64 are respectively of a length slightly less than onehalf of the length of flap 57, and bottom flap 57 is equal in length to the outer wall members 25 and 27, these two members being of equal length, and is equal in width to the end wall members 26 and 28, which are of equal width. Bottom flap 49 of member 26 has been shown as of slightly less width than bottom flap 64 of member 28. This difference in width between these two flaps is a matter of convenience in cutting the blank and is not essential to my invention.

After the blank has been cut as in Figure 5, tab 30 is folded over upon the inner face of end outer wall member 26, the blank is then folded along the crease 29 between members 26 and 27, with members 27 and 28 overlying members 25 and 26, and tab 30 is secured, by gluing or in any other suitable manner, to the left hand end of member 25, as considered in Figures 5 and 6. This produces the partially folded blank of Figure 6, which partially folded blank is shipped flat to the cigar factory or other point of consumption.

At the cigar factory, or other place of use, the blank is folded into box form, preferably by means of a suitable set-up machine, although folding of the blank into box form may be accomplished manually if desired. Where these boxes are used in quantities, as in the cigar industry, the blanks should be folded into box form by machinery, for obvious reasons. In folding the blank of Figure 6, it is first subjected to pressure in the direction indicated by the arrow $p$ so as to move member 27 into parallel relation to member 25, spaced therefrom by end members 28 and 26, this being permitted by hinging action of the members 26, 27 and 28 about the folding creases 29 therebetween and the folding crease 31 between member 28 and tab 30 secured to the back outer wall member 25. The blank is then in the condition shown in Figure 8. Bottom flap 32 of back wall member 25 is then folded upward and forward into position perpendicular to member 25, as shown in Figure 11. The end bottom flaps are then folded upward against the under face of flap 32, as will be clear from Figure 12, after which flap 57, the upper face of which has been coated with glue or other suitable adhesive, is folded upward and rearward into contact with the under faces of flaps 49 and 64 and secured to the latter, producing the partially formed body of the box shown in Figure 13. The inner end wall flaps 51 and 66 are then folded downward and inward, along the folding creases thereof, into spaced substantially parallel relation to the inner faces of the associated end outer wall members, with the lower edges of these flaps seating upon the bottom closure means provided by the bottom flaps. Flap 59 of member 27 is then folded downward and inward into parallelism with member 27 with its lower edge seating upon the bottom closure means and its ends fitting between the inner wall flaps of the end structures so as to maintain the latter in folded condition. In Figure 14 the blank is shown as it appears after the flaps 61 and 66 have been folded downward and inward into the body of the box and, in Figure 15, the appearance of the blank is shown after the flap 59 has been folded downward and inward into parallel spaced relation to the front outer wall member 27. This substantially completes the formation of the body of the box.

In order to form the cover of the box, the elements of the flap 34 are properly folded and secured for that purpose. Tabs 45 are folded along the creases 47 and 48 so as to extend in spaced substantially parallel relation to the end portions of flap 37, as will be clear from Figure 17. The faces of tabs 45 away from flap 37 are then coated with glue or any other suitable adhesive, after which flap 37 is folded along the creases 39 and 40 into spaced substantially parallel relation to the under face of flap 35, and is secured to the latter by means of the tabs 45. This disposes flap 41 at the inner face of back outer wall 25, overlying at one end the tab 30, and flap 41 is secured to the inner face of member 25 by means of a suitable adhesive applied to the outer or back face of flap 41 preliminary to seating it against the inner face of wall 25. This operation of folding and securing the lid will be understood from Figures 18 to 20, inclusive. Since flap 41 corresponds in length to the back outer wall member 25, the ends of this flap are in contact with the folded flaps 51 and 66 forming the end inner walls of the box and in this manner flap 41 cooperates with flap 59, forming the front inner wall of the box, for maintaining flaps 51 and 66 in folded position. The lower edge portion of flap 59 is confined between the front edge of bottom flap 32, disposed at the top of the bottom closure means, and the front outer wall member 27, so that flap 59 is maintained in its folded condition, as shown in Figure 4.

Figure 1:
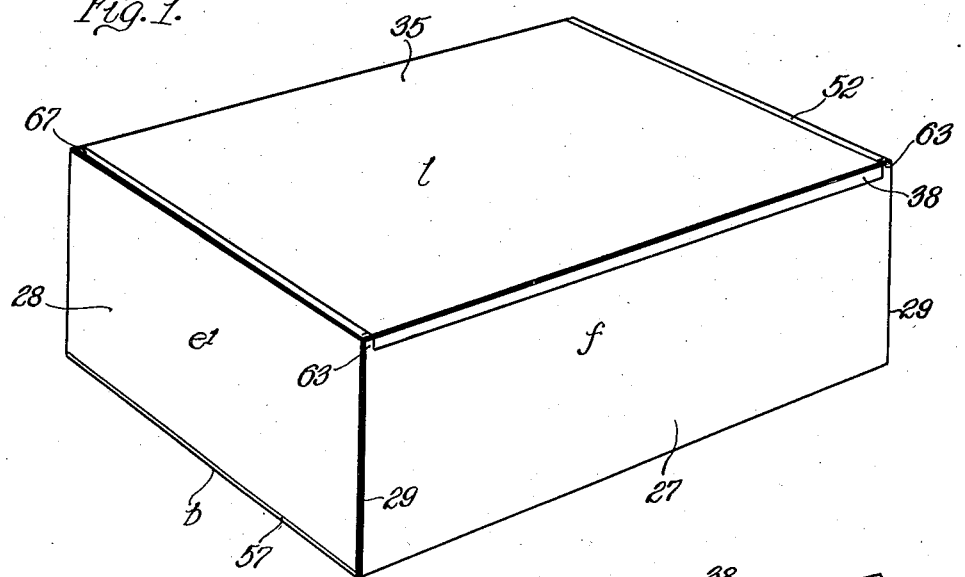
Figure 1 is a perspective front view of a box embodying my invention with the lid in closed position.
Figure 2:
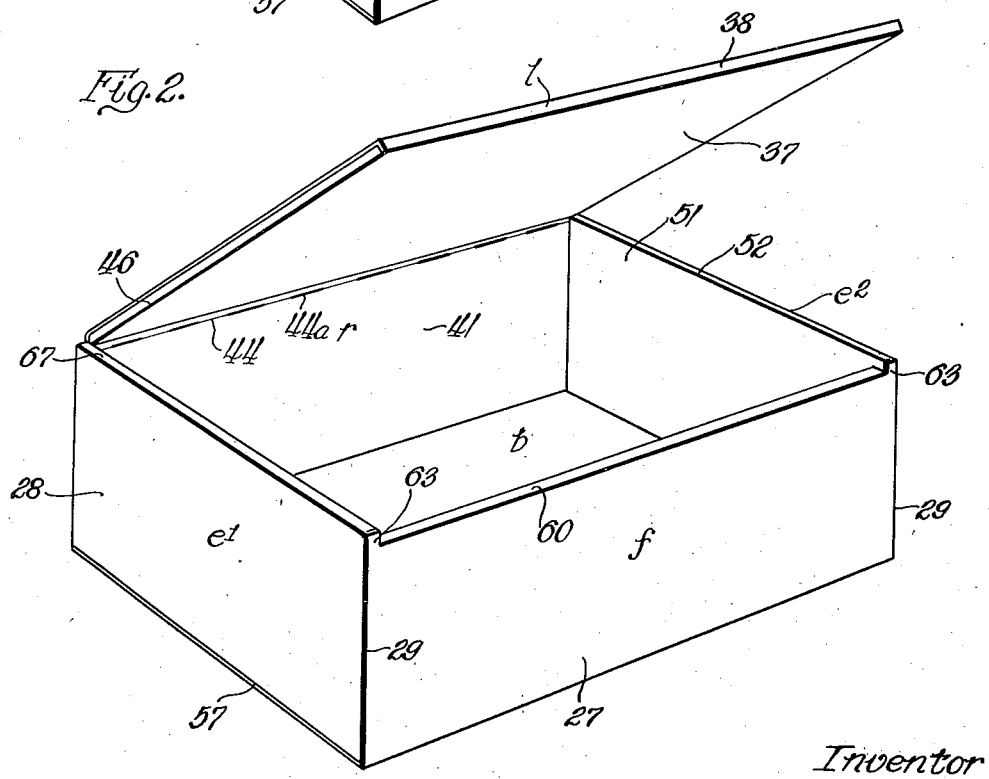
Figure 2 is a view similar to Figure 1 but with the lid in partly opened position.

In the finished box the front and end members thereof are each of hollow double walled construction, being of channel cross section and having the inner wall element or flap of the member seating at its lower edge upon the bottom closure means. This provides a wall structure of adequate rigidity and mechanical strength of a thickness equal to that of the walls of the ordinary wooden cigar box commonly employed, and the lid, when in closed position, fits between the upper portions of the end members of the box, seating at its forward portion upon spacing element 60 constituting the top edge of the front wall of the box and having its upper face flush with the upper faces of spacing elements 52 and 67, constituting the upper edges of the end walls of the box, as shown in Figure 1. In this manner the box may be produced with expedition and facility, and a fraction of the cost of producing the ordinary wooden cigar box, by providing a blank formed as shown and described and folding the blank into box form in the manner stated. In practice, the blank is suitably lithographed and treated so that the box, in its final form, closely simulates the ordinary wooden cigar box in appearance. Due to its hollow wall construction, this box possesses considerable mechanical strength for its intended use and is capable of withstanding punishment to which it may be subject under ordinary conditions of use.

The provision of the spaced slits 44ª along the folding crease 44 is of advantage in facilitating hinging of the lid about the line of crease 44 in opening and closing thereof.

It is desirable, under certain conditions of use, that the body and the lid of the box be stiffened and reinforced. With that object in view I provide suitable inserts, which preferably are so cut and disposed that the grain or fibre thereof is generally perpendicular to the grain or fibre of the box.

In practice, the box blanks are cut from strip cardboard fed lengthwise from a roll. This cardboard has a definite grain, since the fibres thereof are, in general, laid lengthwise of the strip during forming thereof in the paper making machine, as is known. The box blank is of approximately L-shape in plan. The cardboard strip is of a width to have cut therefrom two blanks arranged in reverse relation, with one nested in part within the other, and with their length extending lengthwise of the strip.

Referring to Figure 22, a cardboard strip S is shown fragmentarily, this strip being fed in the direction indicated by the arrow, the latter also indicating the direction of the grain of the strip, which is further indicated by the shade lines. The strip passes beneath or between suitable cutting and scoring means, conveniently in the form of rolls, which acts to cut from the strip box blanks B arranged as shown and as above described, the blanks being suitably scored and creased in the cutting operation. It will be noted that the grain of the cardboard extends lengthwise of all of the elements of each blank B, and that but little waste occurs. In this manner I am enabled to cut the box blanks from the cardboard strip with minimum waste and with the grain running lengthwise of the blank.

Figure 23 illustrates the method of cutting box body reinforcing inserts 70 from a cardboard strip $S^1$, fed lengthwise in the direction of its grain, as indicated by the arrow and the shade lines. Strip $S^1$ is much thicker than strip S, from which the box blank is cut, and corresponds in width to the length of insert 70, in the unfolded condition of the latter, this insert being cut with its length extending across strip $S^1$ as shown. During the cutting operation insert 70 is scored transversely thereof, that is, lengthwise of strip $S^1$, this scoring defining a terminal back wall element $25^a$, an end wall element $26^a$, a front wall element $27^a$, an end wall element $28^a$, and a terminal back wall element $25^b$. The insert 70 corresponds in thickness to the width of spacing elements 52, 60, and 67 of the box blank, which determine the thickness of the end and front walls of the box. It may be formed of a single thickness of material, or of two or more thicknesses secured together by a suitable paste or adhesive, with the grain similarly directed. Elements $26^a$, $27^a$, and $28^a$ of insert 70 correspond in length and height to outer end and front wall members 26, 27, and 28, respectively, of the box, and elements $25^a$ and $25^b$, taken together, correspond in length and height to outer rear wall member 25 of the box. When folded for insertion into the box, insert 70 assumes the form shown in Figure 24.

In Figure 25 I have shown the method of cutting box lid reinforcing inserts 71 from a strip $S^2$ of cardboard, the direction in which this strip is fed and the direction of its grain being indicated by the arrow and the shade lines. Strip $S^2$ corresponds in width to the length of insert 71 and is cut transversely into lengths corresponding to the desired width of the insert, the grain of the latter extending transversely thereof. An insert 71, severed from strip $S^2$, is shown in Figure 26, the direction of the grain thereof being indicated by the shade lines. This insert corresponds in length and width to the inner flap or wall member 37 of the lid, and in thickness to the width of spacing elements 38, 42, and 46 of the cover flap 34. Insert 71 may be formed of a single thickness of cardboard, or of two or more thicknesses, in the same manner as insert 70.

In constructing the reinforced box of Figures 28 and 29, the box blank is folded into the form shown in Figure 8, as previously described. The body insert, folded into the form shown in Figure 24, is then inserted into the body of the box, through the bottom thereof, with the flaps 32, 49, 57, and 64 extended in the planes of the corresponding outer wall members of the box body, and is properly positioned within the latter, as shown in Figure 27. Prior to insertion of insert 70, the outer surfaces thereof may be coated with a suitable adhesive, or the inner surfaces of the outer wall members of the box body may be coated with an adhesive, or adhesive may be applied to both. This operation may be performed by a suitable set-up machine, previously referred to. Insert 70 is thus properly positioned and secured within the body of the partially formed box.

Insert 71 is secured upon the upper face of inner wall or flap 37 of the lid, by means of a suitable adhesive, in the position shown in Figure 27. This operation may occur either preliminary or subsequent to insertion of the body insert 70, but preferably is performed simultaneously therewith. Also, insert 70 may be placed within the body of the box in any other suitable manner. If desired, the inserts 70 and 71 may be properly positioned upon and secured to the blank preliminary to partial folding thereof into box form, the blank, with the inserts secured thereto, being then folded for shipment as in Figure 6.

After the inserts have been properly positioned and secured to the box blank, and the latter has been partially folded as in Figure 27, folding of the blank into box form is completed. The bottom flaps are folded into positions to provide a bottom closure for the box, as previously described, flaps 51 and 66 are folded downward and inward and secured by a suitable adhesive to elements $26^a$ and $28^a$, respectively, of insert 70, flap 59 is folded downward and inward and secured by a suitable adhesive to element $27^a$ of insert 70, flaps 45 are folded over onto insert 71 and secured thereto by a suitable adhesive, flap 37 and insert 71 are folded over onto flap 35 and secured to the latter by a suitable adhesive, and spacing element 42 is secured to the rear edge of insert 71, flap 41 being otherwise unsecured and extending downward into the thus completed box, adjacent the rear wall thereof.

This produces the completed box of Figures 28 and 29. This box is in general similar to that of Figures 3 and 4, but is much stronger and more rigid than the latter box due to the provision of the reinforcing inserts. It will also be noted that the grain of the inserts is perpendicular to the grain of the box blank, which contributes materially to increased mechanical strength of the box. Securing of the front and end inner wall members of the box body to the insert 70, secured to the outer wall members, and of the lid flaps to the insert 71, also contributes to strength and rigidity of the box and to the prevention of distortion thereof. The inserts also have the further advantage that they are effective as guides which greatly facilitate accurate and sharp folding of the associated flaps of the box blank. An additional and important advantage resulting from the use of reinforcing inserts, is that appreciably lighter cardboard may be used for the box blank, effecting a considerable saving in that respect, and such lighter cardboard can be handled with greater facility, effecting a saving in time in the cutting and folding operations.

Referring to Figure 30, box blanks $B^1$ are cut from cardboard strip $S^3$, these blanks being disposed in reversed and partially nested relation, with the grain of strip $S^3$ extending lengthwise of all of the elements of the blank, as in Figure 22. Blank B¹ is, in general, similar to blank B, except that flap 41 and associated elements 42, 43, 44 and 44ᵃ of the latter blank are omitted, and back outer wall member 25ᶜ of blank B¹ conforms in size and shape to front outer wall member 27. Member 25ᶜ is provided, at its upper edge, with a spacing element 60ᵃ defined by two parallel folding creases 61ᵃ and 62ᵃ, connecting member 25ᶜ to the back edge of outer lid flap 35, and with two corner projections 63ᵃ. Element 60ᵃ, creases 61ᵃ and 62ᵃ, and corner projections 63ᵃ respectively correspond to element 60, creases 61 and 62, and projections 63 of the front outer wall member 27, as will be clear from Figure 30. Omission of flap 41 and associated elements effects a corresponding saving in material, it being noted that cardboard strip S³ of Figure 30 is narrower than strip S of Figure 22 by the width of flap 41 and the spacing element 42.

Box body reinforcing insert 70ᵃ of Figure 31 is similar to insert 70 of Figure 23, except that the back wall elements 25ᵈ and 25ᵉ are of reduced height, being of the same height as the front wall element 27ᵃ. Blank 70ᵃ is of a thickness corresponding to the width of spacing elements 60ᵃ, 52, 60 and 67, all of equal width, and lid reinforcing insert 71 corresponds in thickness to the width of spacing element 60ᵃ, the latter and spacing elements 38 and 46 being of equal width.

In providing the box of Figures 32 and 33, the body reinforcing insert 70ᵃ and the cover reinforcing insert 71 are secured to blank B¹ in proper relation thereto, and the latter is then folded into final box form, with the inserts and the associated elements of the box secured together as before. Spacing element 60ᵃ is secured, by a suitable paste or adhesive, to the rear edge of lid insert 71, the lid being hinged to the back of the box for movement about an axis coincident with folding crease 62ᵃ, as will be clear from Figures 32 and 33.

A strip 75 of flexible material of adequate tensile strength, conveniently kraft paper, is secured, by a suitable adhesive, to the under face of the lid and the inner face of the back of the box and spans the hinge connection therebetween. Strip 75 is so disposed as to be under transverse tension, when the lid is in full open position with its rear edge abutting the outer face of the back of the box, as in Figure 33. In this manner, the box may be supported in horizontal position by means of the lid. When the latter is closed, the intermediate portion of strip 75, spanning the hinge connection, is slack and is folded upon itself, between the upper edge of the back wall and the under face of the rear edge portion of the lid, as shown in Figure 32. Both the back and the front of the box are of less height than the ends. The lid, when closed, fits between the upper portions of the ends, with its surface flush with the upper edges of the end walls, as will be clear from Figures 32 and 33.

I have illustrated and described, by way of example, preferred embodiments of my invention. It will be understood, by those skilled in the art, that variations may be resorted to within the broad concept of my invention without departing from the field and scope of the same, and I intend to include all such variations, as fall within the scope of the appended claims, in this application in which the preferred forms only of my invention have been disclosed.

I claim:

1. A blank for producing a box with an attached lid having front and end members and the lid of hollow double walled construction; said blank comprising two end outer wall members, a front outer wall member and a back outer wall member, joined together end to end in alternate relation with folding creases therebetween; bottom flaps extending from the lower edges of said members with folding creases along said lower edges; inner wall flaps connected to the upper edges of said end and front outer wall members with provision for folding thereof into substantially parallel spaced relation to the inner faces of the associated wall members; an outer lid flap extending from the upper edge of said back outer wall member foldable into position perpendicular thereto; an inner lid flap connected to the front edge of said outer lid flap with provision for folding thereof into spaced substantially parallel relation to the under face of said outer lid flap and for securing said two lid flaps together; and a lid securing flap connected to the back edge of said inner lid flap foldable into substantially parallel relation to the inner face of said back outer wall member.

2. A blank for producing a box with an attached lid having front and end members and the lid of hollow double walled construction; said blank comprising two end outer wall members, a front outer wall member and a back outer wall member, joined together end to end in alternate relation with folding creases therebetween; bottom flaps extending from the lower edges of said members with folding creases along said lower edges; inner wall flaps connected to the upper edges of said end and front outer wall members with provision for folding thereof into substantially parallel spaced relation to the inner faces of the associated wall members; an outer lid flap extending from the upper edge of said back outer wall member foldable into position perpendicular thereto; and an inner lid flap connected to the front edge of said outer lid flap with provision for folding thereof into spaced substantially parallel relation to the under face of said outer lid flap and for securing said two lid flaps together.

3. A blank for producing a box with an attached lid having front and end members and the lid of hollow double walled construction; said blank comprising two end outer wall members, a front outer wall member and a back outer wall member, joined together end to end in alternate relation with folding creases therebetween; bottom flaps extending from the lower edges of said members with folding creases along said lower edges; inner wall flaps connected to the upper edges of said end and front outer wall members by spacing elements each defined by two spaced parallel folding creases; the inner wall flap of said front member being of less height than said end and back outer wall members with its ends spaced a short distance inward from the ends of said front outer wall member, the portion of the latter corresponding to its associated inner wall flap being equal in height thereto; the ends of said front outer wall member and said end and back outer wall members being of equal height; an outer lid flap extending from the upper edge of said back wall member with a folding crease therebetween, said outer flap corresponding in length to the inner wall flap of the front wall member and in width to said end outer wall members; an inner lid flap corresponding in length and width to said outer lid flap and connected to the front edge thereof by a spacing element defined by two spaced parallel folding creases; and securing tabs connected to the ends of one of said lid flaps by spacing elements each defined by two spaced parallel folding creases; the bottom flap of said back outer wall member being of less width than said end outer wall members by an amount equal to the width of the spacing element connecting said front outer wall member to its associated inner wall flap.

4. A blank for producing a box with an attached lid having front and end members and the lid of hollow double walled construction; said blank comprising two end outer wall members, a front outer wall member and a back outer wall member, joined together end to end in alternate relation with folding creases therebetween; bottom flaps extending from the lower edges of said members with folding creases along said lower edges; inner wall flaps connected to the upper edges of said end and front outer wall members with provision for folding thereof into substantially parallel spaced relation to the inner faces of the associated wall members; said end and back outer wall members being of equal height and the ends of said front outer wall member being equal in height to said end outer wall members, with the inner wall flaps of the latter equal in height thereto; the inner wall flap of said front member having its ends spaced a short distance inward from the ends thereof and being of less height than the ends of said front member, the portion of the latter corresponding to its associated inner wall flap being equal in height to the latter; an outer lid flap extending from the upper edge of said back outer wall member with a folding crease therebetween, said outer flap coresponding in width to said end outer wall members and in length to said inner wall flap of said front outer wall member; and an inner lid flap corresponding to said outer flap and connected to the front edge thereof with provision for folding of said inner lid flap into spaced substantially parallel relation to the under face of said outer flap and for securing said two lid flaps together.

5. In combination in a box formed of a single piece of material analogous to cardboard, front and end members of hollow multiple walled construction each comprising an inner wall and an outer wall spaced apart, a back member, bottom closure means, and a lid of hollow multiple walled construction integrally hinged at its back edge to the upper edge of said back member and corresponding in exterior width to the exterior width of the box.

6. In combination in a box formed of a single piece of material analogous to carboard, front and end members of hollow multiple walled construction each comprising an inner wall and an outer wall spaced apart, said end members being of greater height than said front member, a back member, bottom closure means, and a lid of hollow multiple walled construction integrally hinged at its back edge to the upper edge of said back member fitting between the upper portions of said end members and seating upon the upper edge of said front member.

7. In combination in a box formed of a single piece of material analogous to cardboard, front and end members of hollow multiple walled construction, a back member, and bottom closure means comprising a top flap having its front portion in a plane above the lower edge of the outer wall of said front member with its front edge spaced a short distance rearward from said outer wall, said front and end members each comprising an outer wall and an inner wall spaced from said outer wall connected to the upper edge thereof at its upper edge and having its lower edge seating on said bottom closure means, the lower portion of said front inner wall being confined against movement away from its associated outer wall by said top flap and said end inner walls being confined against movement away from their associated outer walls by the ends of said front inner wall.

8. In combination in a box formed of a single piece of material analogous to cardboard, front and end members of hollow multiple walled construction, a back member, bottom closure means comprising a top flap having its front portion in a plane above the lower edge of the outer wall of said front member with its front edge spaced a short distance rearward from said outer wall, said front and end members each comprising an outer wall and an inner wall spaced from said outer wall connected to the upper edge thereof at its upper edge and having its lower edge seating on said bottom closure means, the lower portion of said front inner wall being confined against movement away from its associated outer wall by said top flap and said end inner walls being confined against movement away from their associated outer walls by the ends of said front inner wall, and a lid of hollow multiple walled construction comprising on outer wall integrally hinged at its back edge to the upper edge of the back member and an inner wall provided at its back edge with a flap secured to the inner face of said back member with its ends contacting the rearward ends of said end inner walls and confining them against movement away from their associated outer walls.

9. In combination in a box of the character described, a body and a lid therefor formed of a single piece of cardboard, said lid being of double walled construction, said body comprising front and end members of double walled construction, a cardboard reinforcing insert disposed between and secured to the walls of said lid, and a cardboard reinforcing insert extending about said body between and secured to the walls of said members.

10. In combination in a box of the character described, a body and a lid therefor formed of a single piece of cardboard, said lid being of double walled construction comprising inner and outer flaps and a reinforcing insert therebetween, said outer flap extending about and secured to the rear edge of said insert and providing a hinge connection between the rear wall of said body and said lid at the rear lower edge thereof, said inner flap terminating at the rear edge of said insert, and a strip of material secured to the rear under portion of said lid and the inner upper portion of said wall spanning said hinge connection, said strip being placed under transverse tension when said lid is opened into approximately horizontal position.

11. As a new article of manufacture, a three piece box comprising a body and a lid therefor formed of a single piece of cardboard and having front, back and end members and a lid integrally hinged to the upper edge of said back member, said front and end members and said lid being of double walled construction, a one piece reinforcing insert disposed between the walls of said front and end members and at the inner face of said back member, and a one piece reinforcing insert disposed between the walls of said lid.

12. As a new article of manufacture, a three piece box comprising a body and a lid therefor formed of a single piece of cardboard and having front, back and end members and a lid integrally hinged to the upper edge of said back member, said front and end members and said lid being of double walled construction, the inner wall of said front member being connected at its upper edge to the upper edge of the outer wall thereof, said front member being of less height than said end and back members in amount substantially equal to the thickness of said lid, said back and end members being of equal height, a one piece reinforcing insert disposed between the walls of said front and end members and at the inner face of said back member, and a one piece reinforcing insert disposed between the walls of said lid.

13. As a new article of manufacture, a box comprising a body and a lid therefor formed of a single piece of cardboard and having front, back and end members and a lid integrally hinged to the upper edge of said back member, said front and end members and said lid being of double walled construction, a body reinforcing insert disposed between the walls of said front and end members, and a reinforcing insert disposed between the walls of said lid.

14. As a new article of manufacture, a box comprising a body and a lid therefor formed of a single piece of cardboard and having front, back and end members and a lid integrally hinged to the upper edge of said back member, said front and end members and said lid being of double walled construction, the inner wall of said front member being connected at its upper edge to the upper edge of the outer wall thereof by a spacing element, said front member being of less height than said end members in amount substantially equal to the thickness of said lid, said end members being of equal height, a body reinforcing insert disposed between the walls of said front and end members, and a reinforcing insert disposed between the walls of said lid.

NELSON E. FUNK.